UNITED STATES PATENT OFFICE.

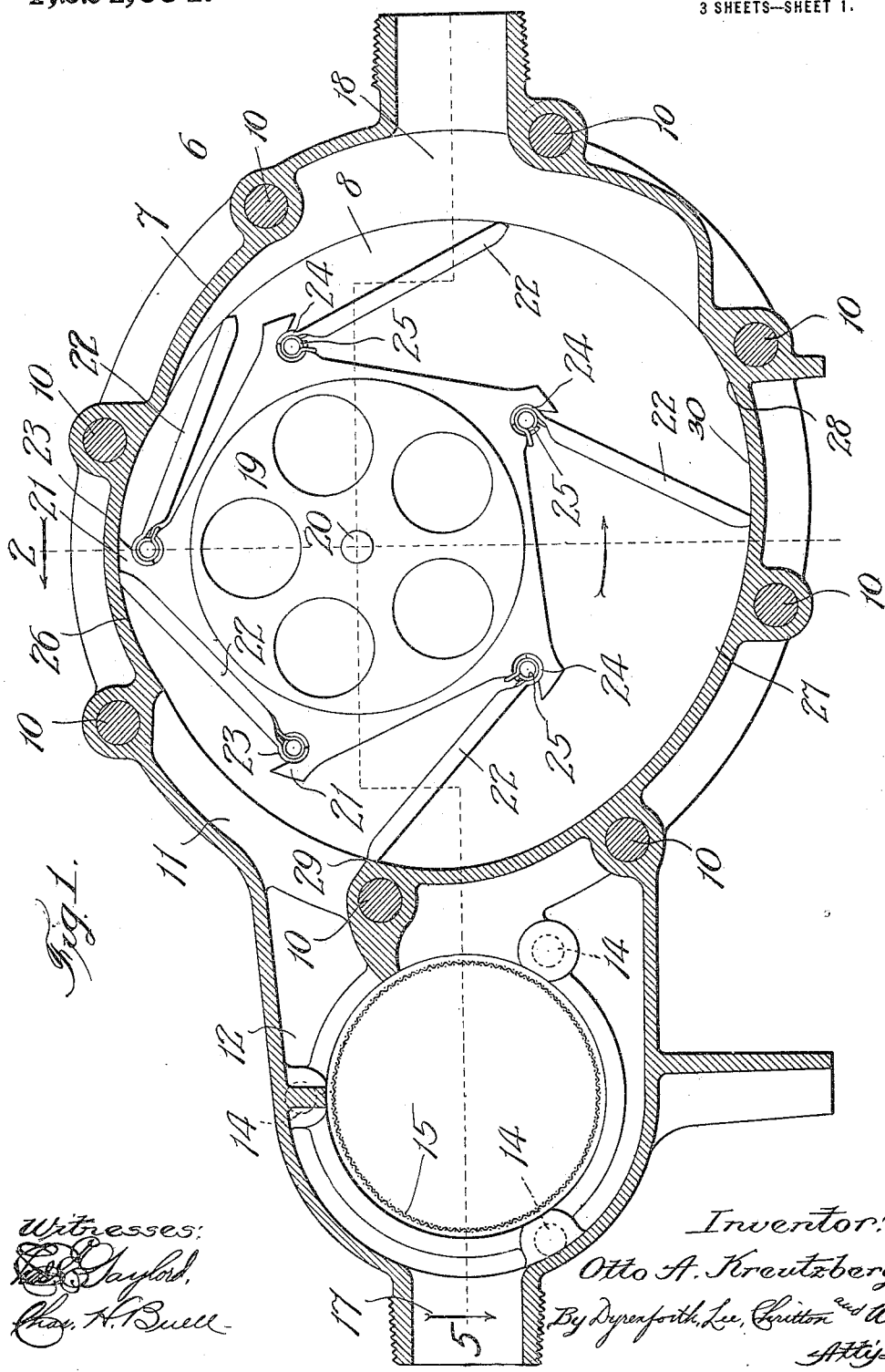

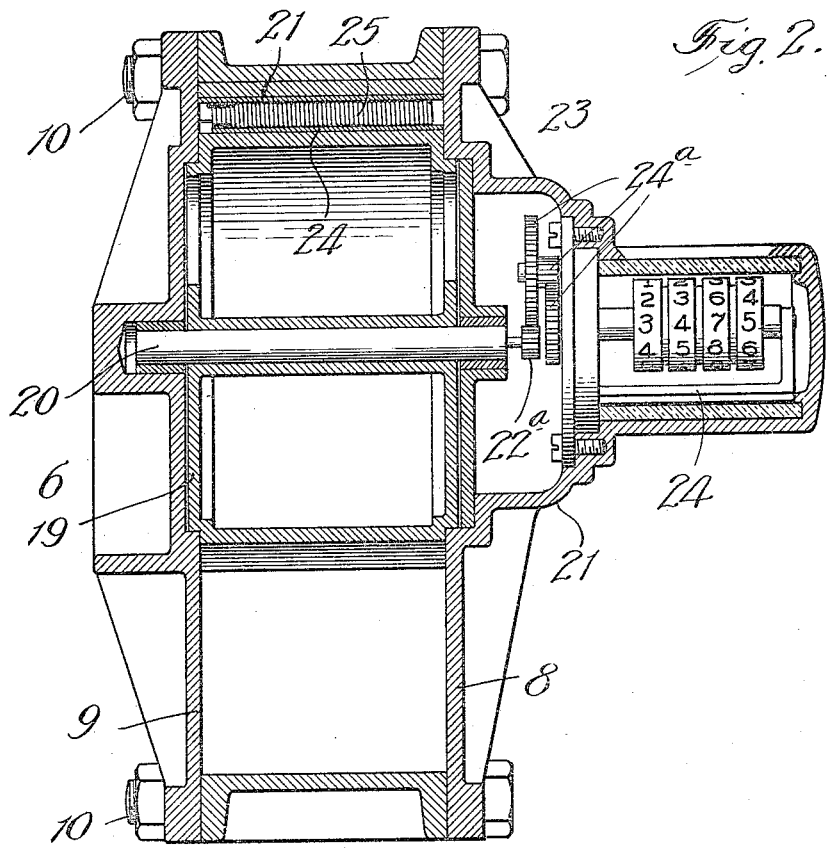
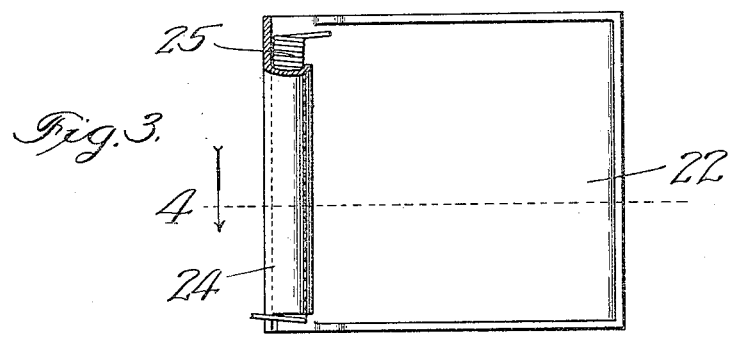
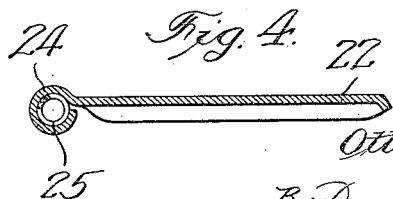

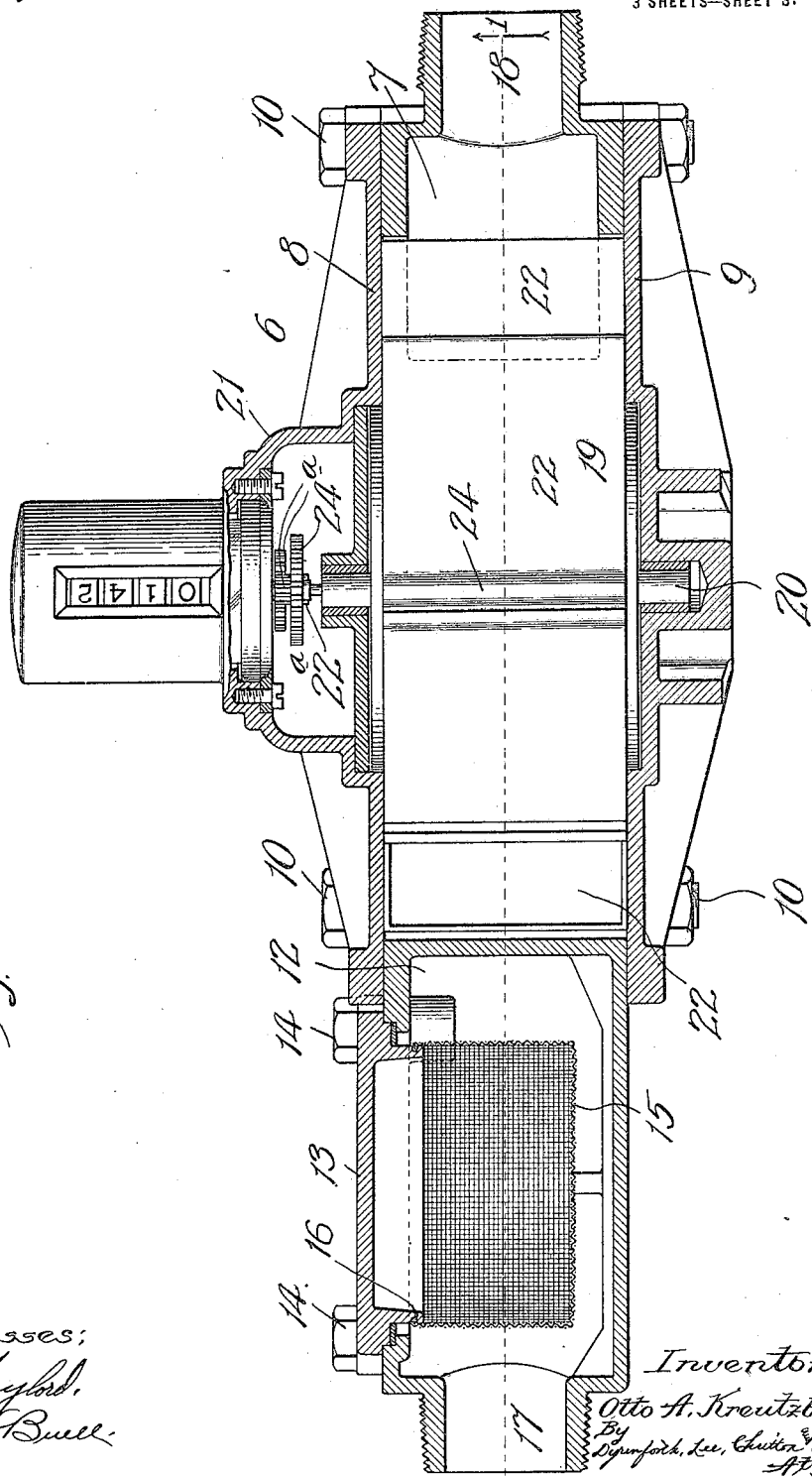

OTTO A. KREUTZBERG, OF LAKE BLUFF, ILLINOIS, ASSIGNOR TO KREUTZBERG METER COMPANY, OF CHICAGO, ILLINOIS, A CORPORATION OF ILLINOIS.

VOLUMETRIC METER.

1,224,654.  Specification of Letters Patent.  Patented May 1, 1917.

Application filed July 25, 1914. Serial No. 853,124.

*To all whom it may concern:*

Be it known that I, OTTO A. KREUTZBERG, a citizen of the United States, residing at Lake Bluff, in the county of Cook and State of Illinois, have invented new and useful Improvements in Volumetric Meters, of which the following is a specification.

My invention relates to improvements in meters for measuring the flow of fluid under pressure; and my object is to provide a meter of simple and improved construction for measuring with great accuracy the volume of fluid, whether it be compressible or non-compressible, in its passage from one point to another.

The particular type of meter to which my invention relates is that employing hinged vanes mounted on a rotary member and coöperating with a guide-wall for presenting pockets into which the fluid flows and in which it is passed through the meter. As meters of this type have heretofore been constructed, they fail to register accurately the volume of fluid passing therethrough, under all conditions of use, as the operation of the vanes is such that the pockets formed thereby are either of variable capacity or unsealed depending on the speed at which the vane-equipped rotary member rotates, in the case of non-compressible fluids, as for example water; or either unsealed, or of uniform capacity, but in the latter case compressing the fluid when of a compressible nature, as in the case of air or gas. In all of these cases the meter fails to accurately register the volume of fluid passing through the meter.

Referring to the accompanying drawings, Figure 1 is a view partly in section and partly in elevation of my improved meter, of a form more especially adapted for measuring the flow of non-compressible fluids as for example water, the section being taken at the line 1 on Fig. 5 and viewed in the direction of the arrow. Fig. 2 is a section taken at the line 2 on Fig. 1 and viewed in the direction of the arrow. Fig. 3 is a plan view of one of the similar vanes employed, a portion thereof being broken away to disclose an interior detail. Fig. 4 is a section taken at the line 4 on Fig. 3 and viewed in the direction of the arrow, and Fig. 5, a section taken at the line 5 on Fig. 1 and viewed in the direction of the arrow.

The shell, or casing, of the meter, represented at 6 is formed of a central hollow portion 7 and side-plates 8 and 9 bolted thereto at 10. In one side of the casing 6 is a port 11 which opens into a well 12 formed in an extension of the casing 6 and having an open side closed by a cover-plate 13, bolted thereto at 14, the well 12 containing a cylindrical screen 15 closed at one end and held in place at its open end on the cover-plate 13, by a clamping ring 16, thereby causing this end of the screen to be closed. The port 11 is preferably elongated and extends upwardly at the portion where it opens into the casing 6. The well 12 at the side thereof opposite that containing the port 11, contains an inlet port 17, and an outlet-port 18 is provided in the casing 6 at the side thereof opposite to the port 11.

In the shell, or casing, 6 is a drum 19 fixed on a rotary shaft 20 which, in the construction shown, for the purpose of providing the meter of compact form, is located above the center of the casing and is journaled in the sides 8 and 9 of the latter as represented, one end of the shaft 20 extending into a supplementary casing 21 wherein the pinion 22$^a$ thereon meshes with the gear-mechanism 24$^a$ of a register 24 of any suitable construction for indicating the volume of fluid passing through the casing 6 and rotating the drum 19 and shaft 20.

The drum 19 is provided peripherally with ribs 21 which are spaced equidistantly about the drum and extend transversely thereof and in which vanes 22 are pivoted as indicated at 23, the vanes lying in the spaces between the ribs 21. The vanes, by preference, are formed at the ends thereof, at which they are pivoted to the drum 19, with hollow cylindrical bearing-sections 24 in which coiled springs 25 are confined, the spring in each vane 22 bearing at one end against the inner side of the vane and at its opposite end, under the tension of the spring, against the drum 19 as represented, the springs being so positioned, and preferably so tensioned, as to cause the vanes to be held at their outer ends against the inner peripheral surface of the casing 6, and thus avoid noise in the operation of the mechanism.

The extreme upper portion of the inner wall of the casing 6 describes an arc concentric with the shaft 20, as represented at 26, this concentric surface being preferably of a length approximately equal to the distance between corresponding points on the ribs 21, and these ribs are preferably so proportioned that they will move in engagement with the concentric surface in their rotation for preventing the flow of the fluid over the top of the drum 19 to the outlet 18.

The lower portion of the inner periphery of the drum 19, preferably from a point slightly in advance of the left-hand end of the concentric surface 26 in Fig. 1 to a point closely adjacent to the lower end of the port 18 in this figure describes a curve preferably corresponding substantially to the involute of a circle, as shown at 27, the curved surface 27 diverging from the path traveled by the pivoted ends of the vanes 22, from the end thereof adjacent to the port 11 to the end of the surface 27 adjacent to the port 18. The surface 27 is preferably of a length slightly greater than the distance between the outer ends of adjacent vanes 22 when the rearmost of these vanes opposes at its outer end the lower edge of the port 11.

In the operation of the meter illustrated the fluid enters the casing 6 through the port 11 and by impinging against the vanes 22 drives the drum 19 in the direction of the arrow in Fig. 1. As a vane, driven by the fluid entering the casing 6, moves at its outer end against the surface 26 in the rotation of the drum, it swings outwardly away from the axis of the drum, thus causing the volume of the space between it and the next succeeding vane to become progressively enlarged as the drum continues its rotation, the effect of which is to exert a suction action on said succeeding vane, which suction action increases as the outer end of the last referred to vane approaches the lower edge of the port 11, the suction action being sufficiently great at the moment of "cut-off", namely, the point at which the vane passes the lower end of the port 11, that this vane is forced into close contact at its outer end with the periphery of the casing as shown in Fig. 1, and a definite invariable volume of fluid is confined in the pocket formed between these adjacent vanes, the outer periphery of the drum 19, and the periphery and sides of the casing 6, and no fluid passes to the outlet 18 except that which is confined in the referred to pocket successively formed as the drum rotates, and thus the accurate measuring of the flow of fluid through the meter is insured.

The gist of my invention consists in providing the surface of the casing against which the vanes 22 move at their outer ends, of such shape that before one vane reaches the outlet, suction action will be produced upon the vane immediately following it, and thus draw the last referred to vane into close contact with the inner periphery of the casing, thereby forming a closed pocket confining a certain volume of fluid, the surface of the casing whereby this result is produced being preferably so shaped as to cause the suction action referred to to be exerted upon the succeeding vane immediately before it reaches, and during its passage by, the lower end of the inlet-port 11 to the casing, as in the case of the particular arrangement shown; the surface 27 being preferably so shaped as shown, viz: of a form substantially that of the involute of a circle, as by so shaping it the desired suction action on succeeding vanes, as they successively move by the port 11 is produced without rebounding of the vanes against the periphery of the casing, though it will be understood that the principle of my invention may be carried out by providing a shorter surface than that shown, diverging from the path through which the pivots of the vanes move and so arranged that the desired suction action on succeeding vanes is produced.

It will be noted that the lower portion of the curved inner surface of the casing immediately in advance of the lower end of the port 18 is more nearly concentric with the axis upon which the drum rotates than is the surface 27, and that this more nearly concentric surface represented at 28 begins substantially at 30; viz., at a point spaced from the cut-off point indicated at 29 on the inner periphery of the casing, a distance substantially equal to the distance between a pair of adjacent vanes when the succeeding vane of the pair is substantially at the cut-off point. While this is not necessary, it is desirable, as thereby the volume of space between these vanes, while both moving against the inner periphery of the casing between the ports 11 and 18, is rendered substantially constant, and the forward one of the pair of vanes is not forced out of contact with the periphery of the casing.

While I have illustrated and described a particular embodiment of my invention, I do not wish to be understood as limiting it thereto, as the same may be variously modified and altered without departing from the spirit of my invention.

What I claim as new, and desire to secure by Letters Patent is—

1. In a volumetric meter, the combination of a casing, a rotary member journaled therein and carrying vanes hinged thereto, said casing having a guide-wall against which said vanes operate, and containing an inlet port and an outlet port, the guide-wall intermediate said ports being so shaped as to permit a vane opposite to it to swing outwardly relative to the next succeeding vane when the latter is opposite said portion of the guide-wall, whereby suction is produced on said succeeding vane drawing it into engagement with said portion of said guide-wall, and indicating means actuated by said member.

2. In a volumetric meter, the combination of a casing, a rotary member journaled therein and carrying vanes hinged thereto, said casing having a guide-wall against which said vanes operate, and containing an inlet port and an outlet port, the guide-wall intermediate said ports being so shaped as to permit a vane opposite to it to swing outwardly relative to the next succeeding vane when the latter is at the point of inlet cut-off, whereby suction is produced on said succeeding vane drawing it into engagement with said portion of said guide-wall, and indicating means actuated by said member.

3. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports diverging relative to the path traveled by the pivots of said vanes in a direction away from the axis of said member for causing the forward vane to exert suction action on the rear vane before said forward vane reaches said outlet port, for drawing said rear vane into engagement with said guide-wall, and indicating means actuated by said member.

4. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports diverging relative to the path traveled by the pivots of said vanes in a direction away from the axis of said member, and so disposed as to begin at a point spaced from the point of cut-off at said inlet port a distance not greater than the distance between adjacent vanes when the rear one of said vanes is at said point of cut-off, and indicating means actuated by said member.

5. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports diverging relative to the path traveled by the pivots of said vanes in a direction away from the axis of said member, and so disposed as to begin at a point spaced from the point of cut-off at said inlet port a distance slightly less than the distance between adjacent vanes when the rear one of said vanes is at said point of cut-off, and indicating means actuated by said member.

6. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports being in the form of a curve continuously diverging from the axis about which said member rotates, beginning at a point distant from the point of cut-off of said inlet port, slightly less than the distance between adjacent vanes when the rear one of said vanes is at the point of cut-off, and indicating means actuated by said member.

7. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports diverging relative to the path traveled by the pivots of said vanes in a direction away from the axis of said member and so arranged as to cause the forward vane to exert suction action on the rear vane to draw it into contact with said wall, with the portion of said wall in advance of said diverging portion thereof shaped to maintain, until the forward one of said vanes reaches said outlet, a space between said vanes substantially of the same volume as the volume of the space existing between said vanes when said rear vane is drawn by said suction action into engagement with said wall, and indicating means actuated by said member.

8. In a volumetric meter, the combination of a casing, a rotary member journaled therein and carrying vanes hinged thereto, said casing having a guide-wall against which said vanes operate, and containing an inlet port and an outlet port, a portion of said guide-wall intermediate said ports being in the form of a curve continuously diverging from the axis about which said member rotates and arranged to cause the forward one of adjacent vanes, in moving against said curved portion, to exert suction action on the rear one of said vanes, to draw it into contact with said wall, with the portion of said wall between the forward end of said curved portion and said outlet being more nearly concentric with the axis of said rotary member than said curved portion, and of such form as to maintain, until the forward one of said vanes reaches said outlet, a space between said vanes substantially of the same volume as the volume of the space existing between said vanes when said rear vane is drawn by said suction action into engagement with said wall, but not of less volume than that existing at the time said rear vane engages said guide-wall and closes to said inlet the pocket formed between said vanes and said casing, and indicating means actuated by said member.

9. In a volumetric meter, the combination of a casing, a rotary member journaled therein and carrying vanes hinged thereto, said casing having a guide-wall against which said vanes operate, and containing an inlet and an outlet port, the distance between said inlet and outlet ports being greater than the distance between ends of adjacent vanes when interposed therebetween, the portion of said guide-wall between said inlet and outlet being so shaped as to permit a vane opposite said portion to swing outwardly relative to the next succeeding vane when the latter is opposite said portion of the guide-wall, for producing suction on said succeeding vane thereby drawing it into engagement with the guide-wall, and produce such engagement at the time the forward vane registers with said outlet, and indicating means actuated by said member.

10. In a volumetric meter, the combination of a casing, a rotary member journaled therein and carrying vanes hinged thereto, said casing having a guide-wall against which said vanes operate and containing an inlet port and an outlet port, a portion of said guide-wall intermediate said ports being so shaped as to permit a vane in moving against it to swing outwardly from the axis of said rotary member at a greater speed than the succeeding vane when said succeeding vane opposes said portion of said guide-wall, and indicating means actuated by said member.

11. In a volumetric meter, the combination of a casing, a rotary member journaled therein and carrying vanes hinged thereto, said casing having a guide-wall against which said vanes operate and containing an inlet and an outlet port, a portion of said guide-wall intermediate said ports diverging relative to the path traveled by the pivots of said vanes in a direction away from the axis of said member, and so arranged as to cause the forward vane to exert suction action on the rear vane to draw it into contact with said wall, with the portion of said wall in advance of said diverging portion thereof shaped to maintain, until the forward one of said vanes reaches said outlet, a space between said vanes of a volume not less than the volume of the space existing between said vanes when said rear vane is drawn by said suction action into engagement with said wall, and indicating means actuated by said member.

12. In a volumetric meter, the combination of a casing, a rotary member journaled therein and carrying vanes hinged thereto, said casing having a guide-wall against which said vanes operate and containing an inlet port and an outlet port, a portion of said guide-wall intermediate said ports being in the form of a curve continuously diverging from the axis about which said member rotates and so arranged as to cause the forward one of adjacent vanes, in moving against said curved portion, to exert suction action on the rear one of said vanes to draw it into contact with said wall, with the portion of said wall in advance of said curved portion thereof shaped to maintain, until the forward one of said vanes reaches said outlet, a space between said vanes of a volume not less than the volume of the space existing between said vanes when said rear vane is drawn by said suction action into engagement with said wall, and indicating means actuated by said member.

OTTO A. KREUTZBERG.

In presence of—
D. C. THORSEN,
O. C. AVISUS.

Copies of this patent may be obtained for five cents each, by addressing the "Commissioner of Patents, Washington, D. C."